United States Patent

Opferman et al.

[15] 3,638,193

[45] Jan. 25, 1972

[54] β-ELEMENT SWITCHING NETWORK CONTROL

[72] Inventors: David Clement Opferman, Middletown, N.J.; Nelson Tsin Tsao-Wu, Boulder, Colo.

[73] Assignee: Bell Telephone Laboratories, Incorporated, Murray Hill, N.J.

[22] Filed: Feb. 2, 1970

[21] Appl. No.: 7,871

[52] U.S. Cl. ....................................340/172.5, 179/18 GF

[51] Int. Cl. ....................................................H04m 7/00

[58] Field of Search ..........................340/172.5, 166, 147; 179/18.7 GF

[56] References Cited

UNITED STATES PATENTS 3,462,743 8/1969 Milewski..........................340/172.5

3,129,407 4/1964 Paull....................................179/18.7

3,485,956 12/1969 Jorgensen et al..................179/18.7

*Primary Examiner*—Gareth D. Shaw

*Attorney*—R. J. Guenther and James Warren Falk

[57] ABSTRACT

Control arrangement for a switching network comprised of reversing switch β-elements in which the states of the β-elements are determined by repetitively subdividing the list of input and output points that are to be connected together into sublists such that each sublist is independent in that it does not contain more than one terminal of any β-element in the network. The iterations are advantageously performed by modifying the terminal numbers encoded in a binary one-less code. The control arrangement provides for automatically achieving nonblocking interconnection of the network input and output points.

13 Claims, 8 Drawing Figures

PATENTED JAN 25 1972

3,638,193

INVENTORS D.C. OPFERMAN
N.T. TSAO-WU
BY Howard R Popper
ATTORNEY

ELEMENT SWITCHING NETWORK CONTROL

BACKGROUND OF THE INVENTION

This invention relates to the control of switching networks and more particularly to apparatus and method for controlling a switching network composed of reversing switch or "$\beta$"-elements.

It is known that a switching network can be devised employing reversing switch $\beta$-elements in such a manner that the network will require fewer switching elements than a network containing make-only elements. One example of such a network is described in an article in the *Bell System Technical Journal* of May 1968 by A. E. Joel, Jr. Equally as important as the savings in the number of crosspoints, however, is the fact that a network employing the reversing switch or $\beta$-element theoretically can be arranged so that it will be nonblocking, i.e., that it will always be possible to establish a communications connection from any idle input point to any idle output point regardless of the order in which the paths are established.

While a mathematical analysis of switching networks composed of $\beta$-elements may show that it should be possible to rearrange the network to provide a path between an input and any desired output, there has not heretofore been available a suitably efficient and automatic way of instituting and effectuating such a rearrangement as the traffic of, for example, actual telephone conversations changes from time to time. Such, however, is the principal object of the present invention.

SUMMARY OF INVENTION

In accordance with the principles of the present invention, the paths through the network are automatically rearranged into nonblocking configurations as the service requesting subscribers desire to be connected to different called terminals by storing in memory the identities of the network terminals between which paths are to be established. This list is then arranged into two independent sublists such that each such sublist contains only one terminal of each pair of terminals associated with a given $\beta$-element, the other terminal of each such pair being contained in the remaining sublist. The states of the $\beta$-elements which are associated with the network input and output terminals are established by employing the terminal numbers which are included in one of the sublists: $\beta$-elements associated with odd terminal numbers remain in the reset or straight-through state while $\beta$-elements associated with even-numbered terminals must be set or placed in the crossover state. Then, a new pair of sublists is formed by modifying the terminal numbers contained in the first pair of sublists and the $\beta$-elements identified by the modified numbers are set. This process is performed iteratively until the state of all of the $\beta$-elements in the network has been established.

We have devised two embodiments for accomplishing this rearrangement. Both embodiments advantageously make use of a coding scheme in which the identities of the network terminals are assigned binary bit patterns in a unique code, hereinafter referred to as the "one-less" code. In one embodiment two memory units are employed. In the first of these memory units each coded designation of a network output terminal is stored at the address determined by the input terminal from which a network path is to be established. In the second of these memories each coded designation of a network input terminal is stored at an address determined by the output terminal to which a network pattern is to be established. These memory units are then alternately scanned. The input terminal and corresponding output terminal designation furnished from each memory unit is treated as an elemental input-output pair for inclusion in a subpermutation respective to that memory unit. The numbers of the input-output pairs in one of these subpermutations are used to set certain of the $\beta$-elements in the network. Then the coded representations of all of the input-output pairs in both subpermutations are modified and the modified designations are employed to control the settings of another group of the network $\beta$-elements. The process of modifying the coded representations and setting a corresponding stage of $\beta$-elements is continued in an iterative manner until all of the $\beta$-elements have been appropriately set at which time the network has been configured so that the desired paths have been established between the input and output points.

In the second embodiment, only one memory for input-output pairs is employed and this memory is sequentially accessed by a counter. The counter sequentially accesses the addresses corresponding to the input terminals. At each memory location defined by the input terminal address there is stored the one-less coded designation of the associated output terminal—as was the case in the first memory unit of the first embodiment. However, in this second embodiment we employ a unique and novel finite state machine and a logic test circuit. The finite state machine preliminarily determines each time the memory is addressed to which subpermutation the address and its contents are to be assigned. The finite state machine is programmed to select addresses which obey the rule that no consecutive addresses belonging to input points of the same $\beta$-element shall be assigned to the same subpermutation. The logic test circuit then examines the coded designations of the output points obtained from the addressed locations to determine if the output points obey a corresponding rule, i.e., that the subpermutation contains no two output points belonging to the same $\beta$-element. Further in accordance with an aspect of these embodiments, the number of $\beta$-elements both of whose output points have been included in the preliminary subpermutation is ascertained. The state of the finite state machine is then advanced in accordance with this number, hereinafter sometimes called the syndrome. The counter is reset and the memory unit reaccessed. This time, the finite state machine will select for inclusion in the preliminary subpermutation a group of input points which differs from the previous group by the syndrome number. When the logic test ascertains that the output points obtained from the memory unit all belong to different $\beta$-elements, the numbers of the input and output points in the subpermutation are employed to set particular $\beta$-elements.

The foregoing and other objects and features of the present invention may become more apparent by referring now to the detailed description and drawings in which.

Figure 1:
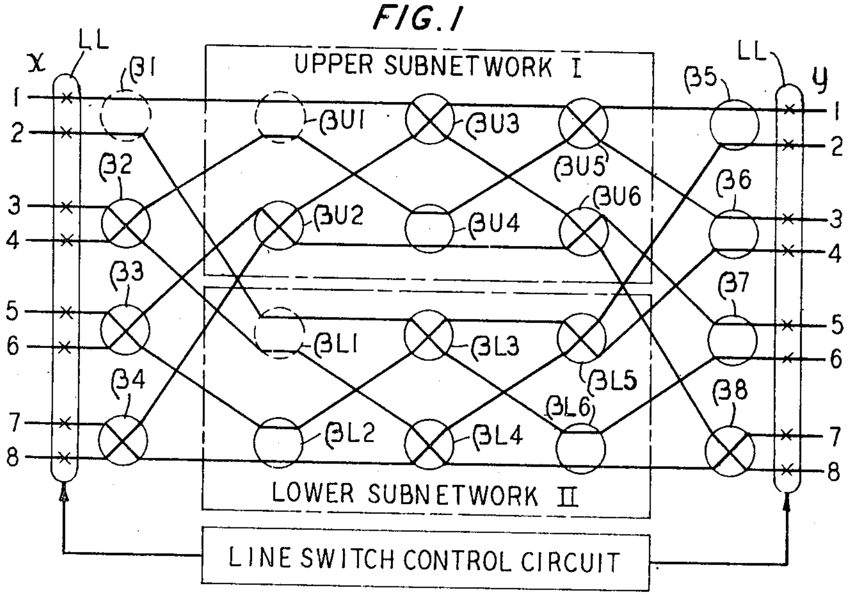
FIG. 1 shows an illustrative $\beta$-element network having eight input and eight output terminals.

Referring now to FIG. 1, there is shown an illustrative switching network containing reversing switch or $\beta$-elements. The terminals at the left are numbered $x_1$ through $x_8$ and the terminals at the right are numbered $y_1$ through $y_8$. The network is to permit connection of any of the terminals $x_1$ through $x_8$ with any of the terminals $y_1$ through $y_8$. For the sake of convenience, terminals $x_1$ through $x_8$ may be thought of as the input points and terminals $y_1$ through $y_8$ may be thought of as the output points of the network. From time to time hereinafter these input and output points of the network will be generically referred to as the end points or terminals of the network.

Although eight input and eight output points are shown in FIG. 1, this figure and the ensuing description is to be taken generally as pertaining to any N-by-N network. In general, each pair of input points is associated with a particular $\beta$-element. For example, input points $x_3$ and $x_4$ are connected to $\beta$-element $\beta 2$, input points $x_5$ and $x_6$ are connected to $\beta$-element $\beta 3$ and so on. Each such $\beta$-element is capable of connecting either of its left-hand terminals to either of its right-hand terminals. In the reset or "0" state, the β-element connects its left- and right-hand terminals in straight-through fashion. In the set or "1" state, the β-element connects its upper left terminal to its lower right terminal and its lower left terminal to its upper right terminal This will hereinafter from time to time be referred to as the straight-through and crossed connection states, respectively. Also, certain of the β-elements such as β1, βU1 and βL1 may be replaced by permanent straight-through wiring for economy without degrading performance of the network.

Between the input and output β-elements, the switching network is divided into two independent subnetworks such as upper subnetwork I and lower subnetwork II. This type of network, sometimes hereinafter referred to as the base 2 network, will have altogether $N(\log_2 N)-N+1$ β-elements arranged into $2(\log_2 N)-1$ stages. Thus, the division of the network into upper and lower subnetworks as shown in FIG. 1, assures that any of the input β-elements can achieve a path to any of the output β-elements regardless of the connections required by the remaining input β-elements. The β-elements in upper subnetwork I are numbered βU1 through βU6. However, as in the case of the input β-elements, the first upper β-element βU1 may be replaced by permanent straight-through wiring in which its upper contact is permanently connected to β-element βU3 and its lower contact is permanently connected to β-element βU4. Similarly, the β-elements in the lower subnetwork II are numbered βL1 through βL6 and as was the case in the upper network, one β-element at the input may be replaced by permanent wiring. In accordance with the control arrangement of the present invention, every one of input points $x_1$ through $x_8$ will be, so far as the β-elements are concerned, supplied with a continuous path to one of the output points $y_1$ through $y_8$ even in the case of a completely idle input and output point. To prevent the actual establishment of a conductive path between end points which are in fact idle, each end point is equipped with a conventional set of cut-through contacts LL which are operated in accordance with conventional telephone practice only when an end point is active.

At any time, a particular input point, which corresponds for example to a calling telephone line, will initiate a call signaling request in the usual manner to indicate a desired connection to a particular one of the output points $y_1$ through $y_8$. For example, in FIG. 1 input point $x_1$ is shown as having a path established to output point $y_8$, the path being traced through the upper contacts of β1 and βU1 and one of the crossover paths through βU3, βU6, and β8. As another example, input point $x_2$ is connected to output point $y_6$ over the path through the lower contact of β1, the upper contact of βL1, one of the crossover paths of βL3, the upper contact of βL6 and the lower contact of β7. The remainder of the connections instantly shown in FIG. 1 may be set forth as follows:

$$\begin{pmatrix} 1 & 2 & 3 & 4 & 5 & 6 & 7 & 8 \\ 8 & 6 & 7 & 1 & 4 & 5 & 2 & 3 \end{pmatrix}$$

in which each number at the top represents one of the input points $x_1$ through $x_8$ and each number at the bottom represents the particular one of the output points $y_1$ through $y_8$ that is connected through the network to a corresponding one of the input points. In general, the permutations of connections through a network of size N-by-N may be represented as:

$$P_N = \begin{pmatrix} x_1 x_2 \ldots x_N \\ y_1 y_2 \ldots y_N \end{pmatrix}$$

In the above expression, each $$\begin{bmatrix} x_i \\ y_i \end{bmatrix}$$

may be called an input-output pair. It will be assumed in this example that any input point $x_i$ will be connected to one and only one output point $y_i$ so that each value of $x_i$ and $y_i$ will occur once and only once in $P_N$.

Figure 2:
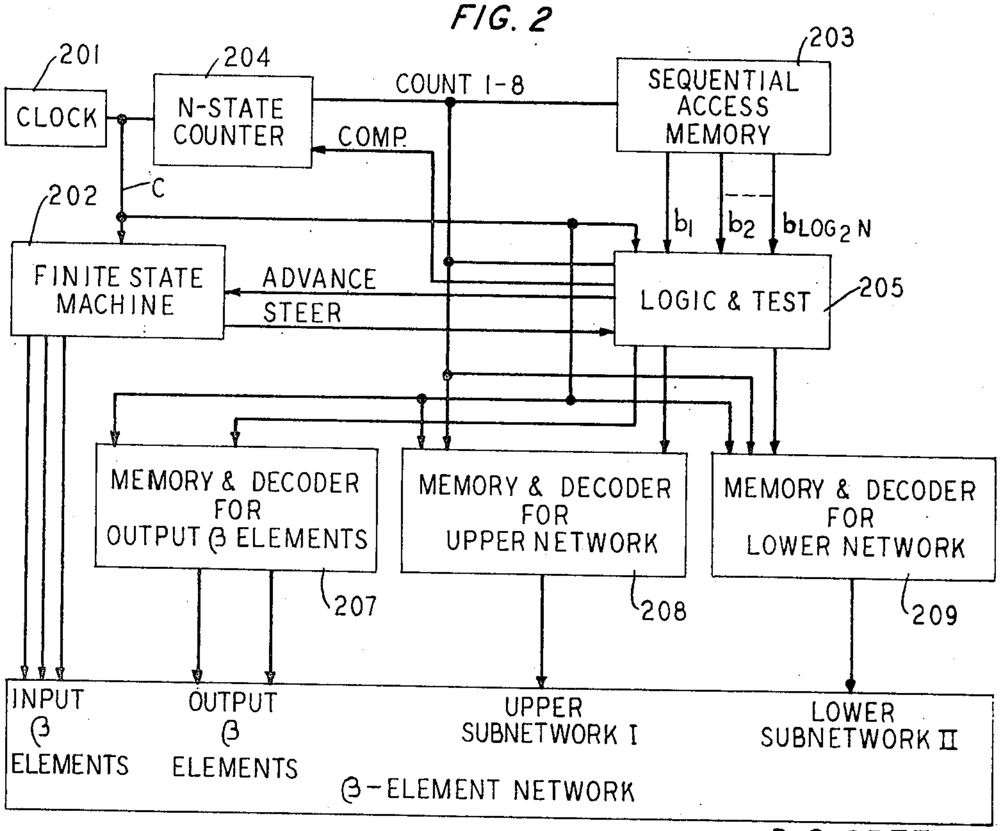
FIG. 2 shows one illustrative embodiment employing a sequential access memory and a finite state machine for controlling the network of FIG. 1 in accordance with the invention.
Figure 3:
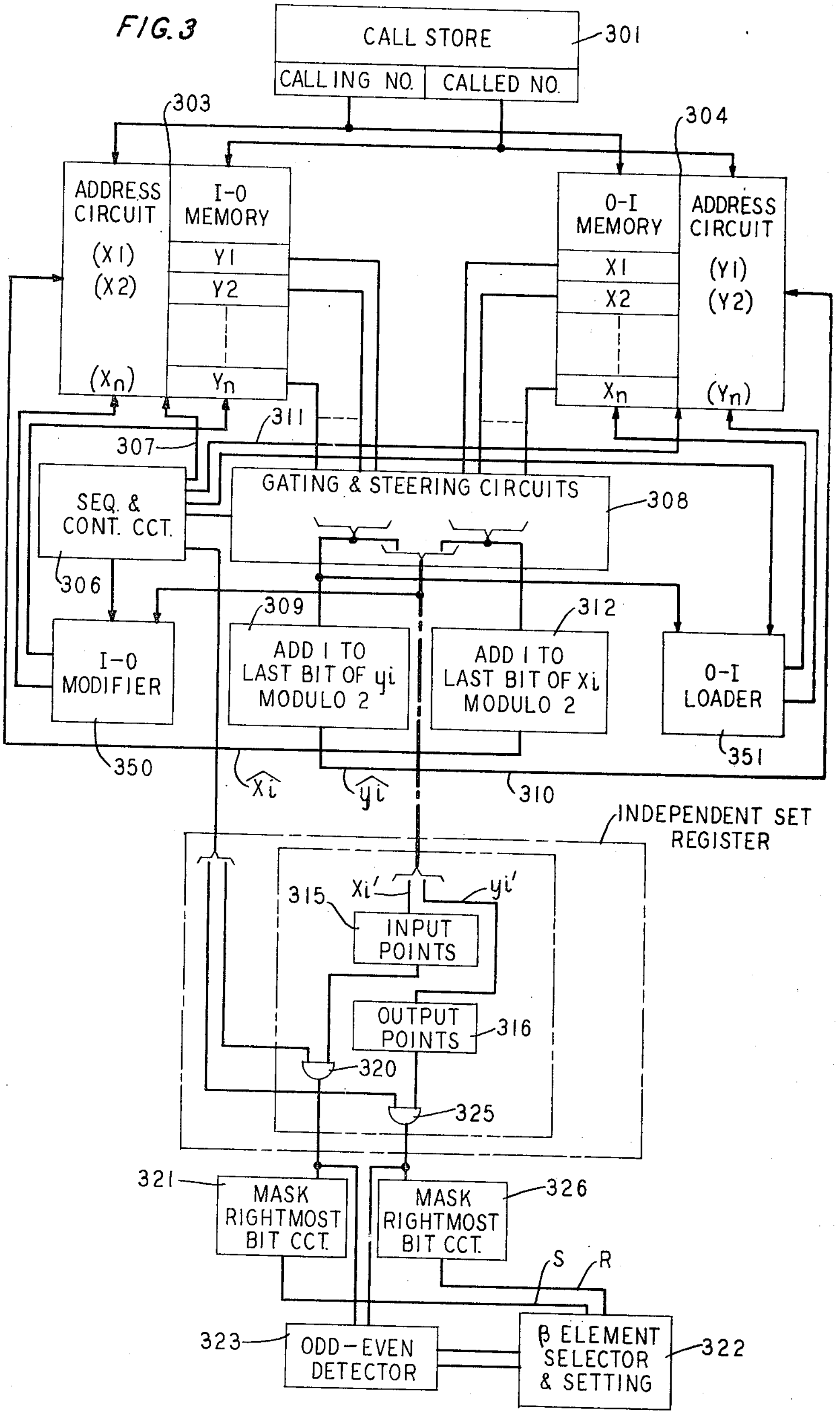
FIG. 3 shows an alternative embodiment employing input-output and output-input memories for controlling a $\beta$-element network according to the invention.

Of course, from time to time the input points will have to be connected to different ones of the output points shown in FIG. 1 and to accomplish this, the states of the β-elements will have to be changed. The change must be made in such a manner that a connection path will always be available through the network to connect any input point to any output point without blocking. In FIGS. 2 and 3 hereinafter to be described, we show embodiments for controlling the states of the various β-elements in the network to achieve such nonblocking interconnection between the network end points. In both these embodiments, the operation of the system is greatly facilitated by assigning each network terminal a numerical identity and by encoding this numerical identity into a binary code which is similar to the conventional binary coded decimal representation except that the code is skewed so that each terminal of the network is encoded by taking that BCD representation which is one-less than would be conventionally assigned to a decimal number. For example, input terminal $x_1$ which would normally be represented in BCD form by the binary bits 0 0 1 will be represented in the one-less code hereinafter to be utilized in the illustrative embodiments of this invention by the digits 0 0 0. For convenience, Table I below lists the correspondence between decimal digits and the corresponding bit patterns in the one-less codes.

TABLE I

| | |
|---|---|
| 1 | 000 |
| 2 | 001 |
| 3 | 010 |
| 4 | 011 |
| 5 | 100 |
| 6 | 101 |
| 7 | 110 |
| 8 | 111 |

The one-less code permits certain simplifications in the logic circuitry necessary for carrying out the present invention. For example, the one-less code permits a relatively easy logical test to be made to identify end points associated with the same β-element. For example, in FIG. 1 it is seen that input terminals $x_5$ and $x_6$ are both associated with β-element β3. This is demonstrated by the first two bit positions of the coded designations 1 0 0 and 1 0 1 of terminals $x_5$ and $x_6$, respectively, since these first two bit positions are 1 0 in each case. In addition the rightmost bit of the one-less coded designation of each terminal identifies whether the terminal is odd or even, the rightmost bit being a "0" in the case of an odd terminal number and a "1" in the case of an even terminal number.

We have discovered that a network such as that of FIG. 1 may always be reconfigured to establish nonblocking connections between any given permutation of input and output points if the permutation list of input and output points is subdivided into two sublists of points such that no sublist containing one point associated with a particular β-element contains the other point associated with that β-element. Further, we have discovered a way of setting the stages of the switching network in accordance with the number of the end points selected for inclusion in the sublist and by iterative modification of the numbers in these sublists sequentially to set all of the remaining β-elements in the network so that nonblocking paths will be defined.

Referring now to FIG. 2, there is shown one embodiment of the present invention for controlling the connections in a network comprised of reversing switch β-elements to provide nonblocking interconnection between the network input and output points. In this embodiment a single, sequential access memory unit 203 is employed in which the bit patterns of the output points are stored at the addresses of the network input points. While the embodiment of FIG. 2 may be thought of as controlling a simple eight-by-eight network of the type shown in FIG. 1, it is in general applicable to any size network. For an eight-by-eight network, the eight network output points may be encoded by means of a three-bit pattern in the aforementioned onedless code. For a larger size network, having more output points, a correspondingly greater number of bits will be required to encode the output point numbers. However, for the sake of simplicity, three-bit output leads B1–B3 for three-bit output words are shown.

Figure 5:
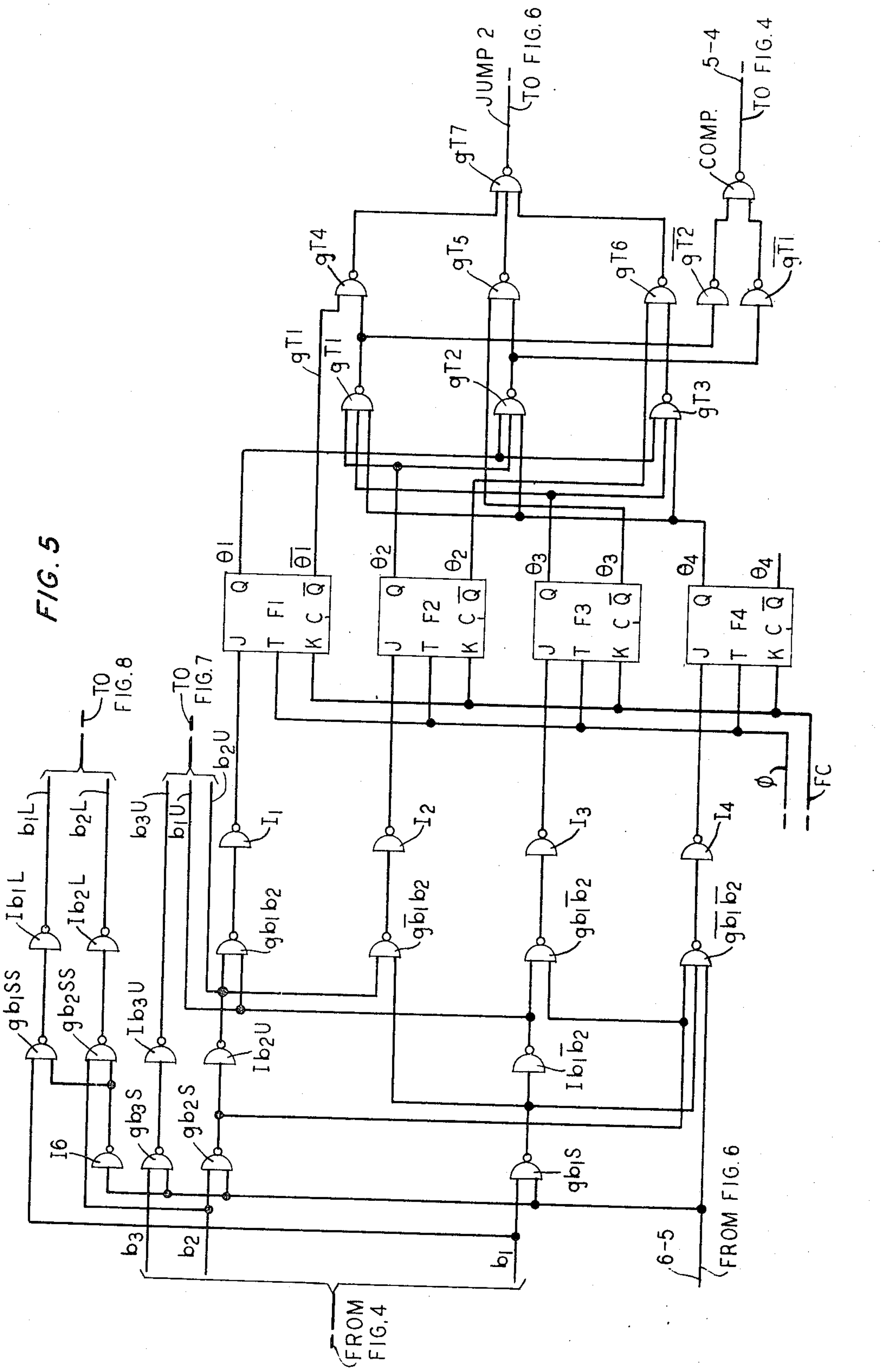

N-state counter 204 is started into operation by clock 201 and sequentially interrogates each of the N addresses in sequential access memory 203. Each time an address is interrogated, the code pattern identifying the output point is applied to logic and test circuit 205. Circuit 205 examines the bit pattern of the outputs defined for the upper network by the finite state machine and registers them in a bank of flip-flops (FIG. 5). When all of the code patterns have been read out of sequential access memory 203, the flip-flops in logic and test circuit 205 will be set to indicate the number of output pairs (denoted as the syndrome) in the subpermutation which has been formed for the upper network. If these flip-flops in logic and test circuit 205 indicate syndrome zero, logic and test circuit 205 instructs memory decoders 207, 208, and 209 to set the β-elements in the switching network. If the syndrome equals one or two, then the finite state machine is advanced one or two states, respectively, and the memory 203 is then reaccessed, as before.

Each time a clock pulse advances the state of N-state counter 204, finite state machine 202 is caused to designate to logic and test circuit 205 whether the pattern of output bits being examined by circuit 205 belongs to a first or second subpermutation for upper subnetwork I and lower subnetwork II, respectively. In terms of the network of FIG. 1, the first or second subpermutation corresponds to β-elements comprising upper subnetwork I and lower subnetwork II, respectively. On the clock pulse producing the first count in counter 204, finite state machine designates that the output bit pattern on leads B1 through B3 is assigned to upper subnetwork I. On the clock pulse producing the second count from counter 204, the output bit pattern on leads B1–B3 is automatically assigned to the second subpermutation, i.e., the one associated with lower subnetwork II. This takes place because it will be remembered that the sequential addresses in memory 203 correspond to the input points 1–8 at the left-hand side of the network of FIG. 1. These addresses are sequentially accessed by counter 204, hence the designation of memory 203 as being a sequential access memory. As the addresses are selected by counter 204, finite state machine 202 designates whether each address and the contents of the corresponding location in memory 203 are to be included in the first or second subpermutation. On counts of counter 204 following the second count, the pattern of remaining addresses selected by finite state machine 202 for inclusion in one of the subpermutations is such that if a particular count, $j$, designates an address for inclusion in that subpermutation, machine 202 will not designate the address given by a count whose integer value is $(j+1)/2$ for inclusion in the same subpermutation. The designation of first or second subpermutation is made by whether lead STEER at the output of logic and test circuit 205 is energized or not. The status of the STEER lead is determined by the setting of flip-flops (FIG. 6) internal to finite state machine 202 which flip-flops determine the pattern of addresses that shall be chosen for inclusion in the different subpermutations.

Once a sublist of addresses is chosen, the contents of the locations designated by the addresses is tested. If these locations contain a set of numbers of output terminals which set also obeys the rule that no two terminal numbers belonging to the same β-element be included in the same sublist, the sublists are independent and the states β-elements of the network may be established from these sublists. If, however, the check of the encoded numbers reveals that the set is not in conformity with the rule, the finite state machine is instructed to select a new pattern of addresses. The new pattern of addresses will differ from the old pattern by the syndrome number. That is, if the test showed that only one output β-element had both its terminals included in one of the sublists, the new pattern of addresses will differ from the old by only one address selection. If the test showed that two output β-elements had both terminals included in the same sublists, the new pattern of addresses selected by the finite state machine for inclusion in one of the sublists will differ from the old pattern by two addresses.

In general, for an N-by-N terminal network, there are $$2^{\left(\frac{N}{2}-1\right)}$$

different permutations of addresses. Finite state machine generates one of these finite permutations until a network selection is found. For the case of an eight-by-eight network, the permutations of address selectable for inclusion in one of the sublists are: 1357, 1358, 1367, 1368, 1457, 1458, 1467, and 1468.

DUAL MEMORY EMBODIMENT

Referring now to FIG. 3, there is shown an alternative illustrative embodiment of the present invention which employs reciprocal memories 303 and 304 for storing the identities of the terminals between which connections are to be effective. As the identity of the terminals corresponding to the calling and called numbers between which a network connection is to be established is made known, the respective terminal numbers, sometimes hereinafter referred to as the input-output pair, are entered into the respective calling number and called number segments of call store 301. The numbers of the input and output terminals are transferred from call store 301 and, in accordance with the invention, stored in memory units 304 and 303, respectively, in the aforementioned one-less code.

Input-output memory 303 is, for the sake of simplicity, shown as being organized so that a different word location is provided for storing the number of every output terminal $y_1$–$y_N$, in the switching network. The output terminal numbers are stored at locations whose addresses, ($x_1$–$x_N$), are selected by the calling number segment of call store 301. That is, each network input terminal $x_1$ through $x_N$ designates an address ($x_1$) through ($x_N$) of a word location in memory 303. In addition to the bit pattern $y_i$ identifying each output terminal, a marking bit (not shown) may also be stored which is changed from "0" to "1" as each output terminal number is taken from memory 303 by gating and steering circuit 308.

Output-input memory 304 may be physically identical in all respects to input-output memory 303 except that it is organized on the basis that the memory words stored are the bit patterns representing the input terminal numbers $x_1$–$x_N$ of the network. These bit patterns are stored at the addresses ($y_1$)–($y_N$) of the output terminals to which corresponding connections are to be established.

When memory units 303 and 304 have been updated by call store 301 with the identities of all of the terminals in the network between which connections are to be established, the remaining apparatus of FIG. 3 is placed under the control of sequence and control circuit 306. Circuit 306 initially energizes lead 307 to cause input-output memory unit 303 to read out the word stored at address ($x_1$). The marking bit of the word $y_1$ stored at this location is set, and simultaneously, circuit 306 controls gating and steering circuit 308 to transmit the word $y_1$ to the $y_i$ adding circuit 309. Adding circuit 309, by adding 1 on a modulo 2 basis to the last bit of the terminal number $y_1$ encoded and stored in the aforementioned one-less code, ascertains the identity of the mate terminal of the same β-element whose terminal identity $y_1$ has just been read out of memory 303. This information, $\hat{y}_1$, sometimes hereinafter referred to as the dual of the first terminal number, is entered over lead 310 into the address circuit portion of output-input memory 304. Next, sequence and control circuit 306 energizes lead 311 to read out the word $x_2$ at the location in memory 304 whose address is $y_2=\hat{y}_1$. Simultaneously, the marking bit associated with this word is also set.

In terms of the illustrative network of FIG. 1 having eight input and eight output terminals, and of the particular input-output permutation, $P_8$, given before:

$$P_8=\begin{pmatrix}1&2&3&4&5&6&7&8\\8&6&7&1&4&5&2&3\end{pmatrix}\text{ or }\begin{pmatrix}000&001&010&011&100&101&110&111\\111&101&110&000&011&100&001&010\end{pmatrix}$$

and $x_1$=1 or 000, $y_1$=8 or 111, $\hat{y}_1$=7 or 110 and the word read out, at the location whose address is ($\hat{y}_1$=7) is $x_2$=3 or 010 in the one-less code. This word, $x_2$, is transferred by gating and steering circuit 308 under the control of sequence circuit 306 to circuit 312 which computes the dual of $x_2$ and applies the result ($\hat{x}_2$=4) on lead $\hat{x}_i$ to the address circuit portion of input-output memory 303. Memory 303 then reads out the word $y_2$ which in the illustrative example is output terminal number 1 or 000 in the one-less code. The word $y_2$ is now transferred to circuit 309 in the same manner as previously accomplished for word $y_1$. Operations continue in this manner until all the words in memories 303 and 304 have been read out.

Each time memory unit 303 is accessed, the contents $y_i$ of the addressed location is also transferred by gating and steering circuits 308 to output point register 316. Similarly, as memory unit 303 is accessed, the address location $x_i$ is transferred by gating and steering circuits 308 to input points register 315. The contents of input point register 315 under the control of circuit 306 is transferred through gate 320 to logic circuit 321 which masks the rightmost bit of the word. Since the word is encoded in the aforementioned one-less code, masking the rightmost bit has the effect of adding one to the terminal number, dividing the sum by two and obtaining the integer quotient result. This can be seen by examining the following table:

| Decimal | One-less | Rightmost Masked | Decimal |
|---|---|---|---|
| 1 | 000 | 00 | 1 |
| 2 | 001 | 00 | 1 |
| 3 | 010 | 01 | 2 |
| 4 | 011 | 01 | 2 |
| 5 | 100 | 10 | 3 |
| 6 | 101 | 10 | 3 |
| 7 | 110 | 11 | 4 |
| 8 | 111 | 11 | 4 |

The output of circuit 321 is applied to β-element selector and setting circuit 322 to select the β-element whose state is to be established. The state of this β-element is determined by the output of odd-even detector circuit 323 which examines each output of gate 320 as it is applied to logic circuit 321. Odd-even detector circuit is arranged to provide a set output to circuit 322 whenever the number appearing at the output of gate 320 is even and a reset output to circuit 322 whenever the number appearing at the output of gate 320 is odd.

Similarly, gate 325 under the control of sequence and control circuit 306 sequentially presents the contents of output point register 316 to logic circuit 326 which in all respects is similar to logic circuit 321. Logic circuit 326 controls circuit 322 in the setting of the β-elements on the output side of the network.

The foregoing operation continues until circuit 306 detects that one output from each output β-element has been masked in the I–O memory 303; and, consequently, one input from each input β-element in the O–I memory 304 has also been masked. Now the input-output pair for the upper subnetwork I and the lower subnetwork II are defined by the masked words in the I–O and O–I memories, respectively.

The I–O memory is rearranged so that the first N/2 locations define the input-output pairs for the upper subnetwork and the last N/2 locations are for the lower subnetwork. This arrangement is accomplished by shifting the words $y_i$ that are masked and the corresponding address $x_i$ from memory 303 to I–O modifier 350. This unit sets the last bit of the output $y_i$ to "0," and stores this output at location defined by the integer part of $(x_i+1)/2$. Then the mask words $x_i$ and the corresponding address $y_i$ in memory 304 are shifted to I–O modifier 350. The last bit of address $y_i$ is set to "1" and stored in the location defined by $$\left(\frac{N}{2}+\text{integer part of }\frac{x_i+1}{2}\right)$$

Now the I–O memory contains input-output pairs for the upper subnetwork and lower subnetwork in the memory location 0 to N/2 and (N/2)+1 to N, respectively. The input-output pairs for these subnetworks are designated by the "0" or "1" in the last bit position.

The O–I memory is now loaded by shifting the contents ($y_i$) of the I–O memory and the corresponding address ($x_i$) to the O–I Loader 351. This unit causes the input $x_i$ to be stored at the address $y_i$ for the input-output pairs in the upper subnetwork and at address $(N/2)+y_i$ for the lower network. The sequence and control circuit 306 sends the necessary timing signals to the I–O Modifier 350 and the O–I Loader 351.

The contents of the I–O and O–I memories are considered as two $$\left(\frac{N}{2}\times\frac{N}{2}\right)$$

network. The preceding method of setting input and output β-elements and modifying the I–O memory and loading the O–I memory is applied. This time the I–O and O–I memories are divided into four sections—one for each N/4×N/4 subnetwork. The second from the last bit of the output code is set to "0" or "1" defining the upper and lower subnetworks of the N/2×N/network. Therefore, each of the four N/4×N/4 networks are defined by the last two bits.

This procedure is continued until all of the subnetworks are 2×2, and, consequently the settings of all of the β-elements in the N×N network are determined.

s-NETWORK CONTROL USING FINITE STATE MACHINE

As was true of the two-memory arrangement of FIG. 3, the alternate embodiment of our invention, shown in block diagram in FIG. 2 and in detail in FIGS. 4–8 and employing a finite state machine, hereinafter to be more fully described, will also determine the states of the β-elements in a β-element switching network containing N input and N output terminals. Although at any instant it will be highly unlikely that each of the input terminals in the network will be required to have an active connection with one of the output terminals, the ensuing description assumes this condition to exist. The fact that paths will be established within the network between terminals that may be associated with idle subscribers need cause no inconvenience inasmuch as the usual subscribers' cut-through relays (LL in FIG. 1) will not be operated unless the subscribers' call signaling dictates that the network connection is to be used.

Figure 4:
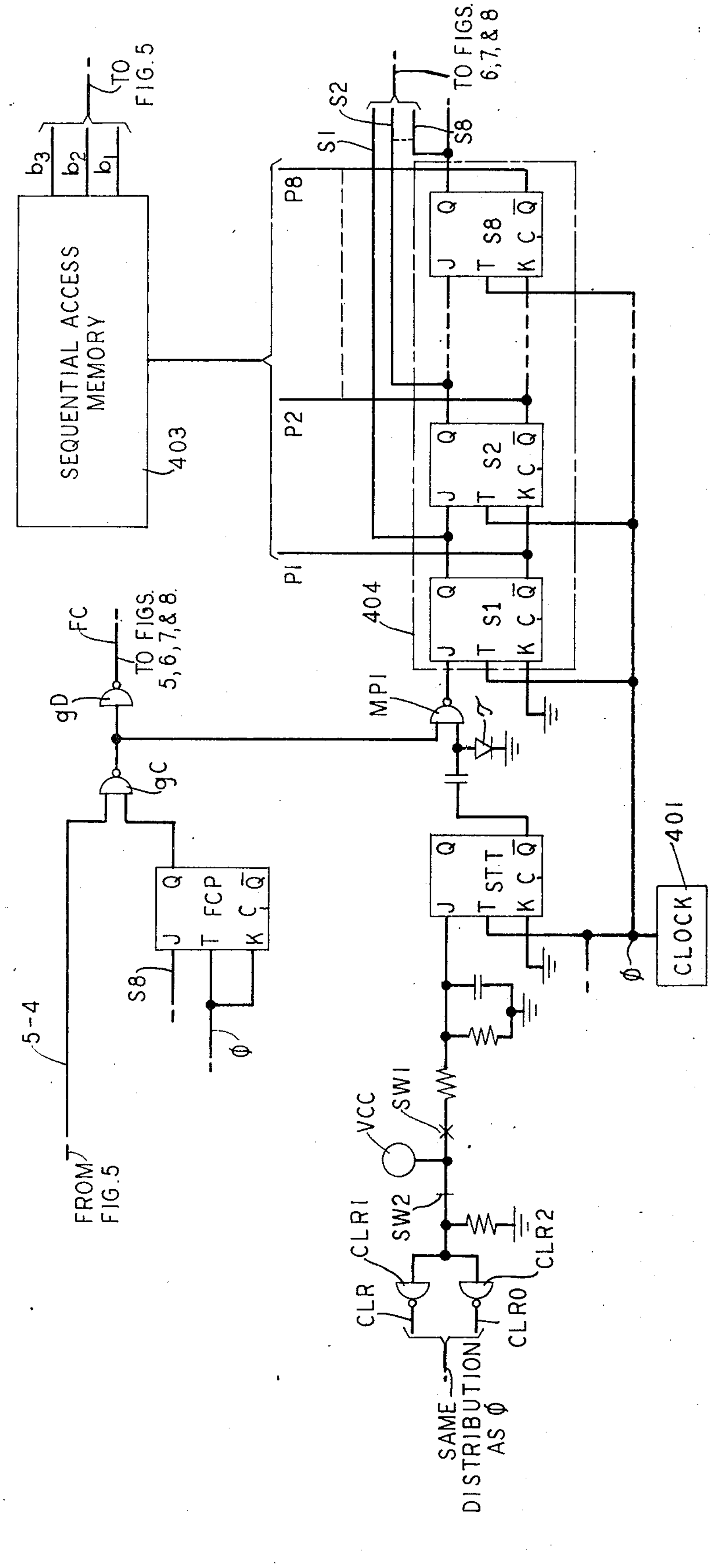
FIGS. 4–8 show details of the embodiment of FIG. 2.

FIGS. 4 through 8 show the details of the arrangement which is shown in block diagram form in FIG. 2. The embodiment of FIGS. 4 through 8 is specifically adapted to control a network of the type shown in FIG. 1 containing eight input and eight output points. FIG. 4 shows a clock 401, an eight-state counter 404, and a sequential access memory 403.

The addresses of the storage locations in memory 403 (shown as 203 in FIG. 2) correspond to the numbers of the network input terminals while the locations themselves contain the one-less binary coded designations of the network output terminals to which connections are to be made. The addresses are sequentially accessed by counter 404—hence the name-sequential access memory. As the addresses are selected by the counter, finite state machine in FIG. 6 (202 in FIG. 2) designates whether each address and its contents are to be included in a first or in a second sublist. Finite state machine always assigns the address and contents selected by the first count of the counter to the first sublist and the address and contents selected by the second count to the second sublist. On succeeding counts, finite state machine selects a pattern of the remaining addresses such that if a particular count designates an address (*j*) for inclusion in one sublist, it will not designate the address given by the integer value of $(j+1)/2$ for inclusion in that sublist. Once a sublist of addresses is chosen, the contents of the locations designated by the addresses is tested. If these locations contain a set of numbers of output terminals which set also obeys the rule, the sublists are independent and the states β-elements of the network may be established from these sublists. If, however, the check of the encoded numbers reveals that the set is not in conformity with the rule, the finite state machine is instructed to select a new pattern of addresses. The new pattern of addresses will differ from the old pattern by the syndrome number. That is, if the test showed that only one output β-element had both its terminals included in one of the sublists, the new pattern of addresses will differ from the old by only one address selection. If the test showed that two output β-elements had both terminals included in the same sublist, the new pattern of addresses selected by the finite state machine for inclusion in one of the sublists will differ from the old pattern by two addresses.

In general, for an N×N terminal network, there are $$2^{\left(\frac{N}{2}-1\right)}$$

different permutations of addresses. Finite state machine generates one of these finite permutations until a network selection is found. For the case of an eight-by-eight network, the permutations of address selectable for inclusion in one of the sublists are: 1357, 1358, 1367, 1368, 1457, 1458, 1467, and 1468.

Clock 401 may be assumed to be free running and applies square-wave pulses to lead Φ which is connected to the circuits of FIGS. 4 through 8. Sequential access memory 403 may advantageously employ conventional magnetic cores or, in simplified form, may merely comprise a plug and jack wiring arrangement in which the plugs P1 through P3 are sequentially pulsed by respective stages of counter 404 and in which the jacks are wired to the inputs of three, 4-input NAND gates (not shown) the output of which NAND gates provides the three-bit, one-less code pattern on leads *b*1, *b*2, and *b*3. Such cross-connections between eight output points and the 12 input points of such NAND gates being obvious from the foregoing discussion it is not deemed necessary to set them forth in the drawing.

At the outset, all of flip-flops S1 through S8 comprising the eight-state counter 404 are reset. All of the flip-flops in this and the other figures of the drawing are of the well-known "J–K" type in which the state of the flip-flop is determined by the J or K input when the toggle signal is applied to the T input. If both J and K inputs are energized when the toggle signal is applied, the flip-flop merely changes to the state opposite the one it was in before the toggle was applied.

When the start switch SW1 in FIG. 4 is operated, the J input of the start flip-flop STT receives a high signal input from voltage source $V_{cc}$. On the next clock pulse applied to lead Φ, the toggle input T of the start flip-flop is energized and a low signal appears at the $\overline{Q}$ output of the start flip-flop causing monopulser MP1 to apply a high signal to the J terminal of the S1 flip-flop of eight-state counter 404. The setting of flip-flop S1 causes a low signal to appear on plug lead P1. As mentioned before, this signal interrogates the first memory location containing the one-less coded designation of the network output point to be connected to network input point X1. The coded output appears on lead *b*1, *b*2, and *b*3 and is applied to logic and test circuit 505 of FIG. 5.

Assuming, for example, that the code pattern on leads *b*1, *b*2, and *b*3 was 110 representing network output point $y_7$ in FIG. 1, gates *gb*1S and *gb*2S in FIG. 5 will have high signals applied to their upper input terminals. The lower input terminal of these gates, as well as of gates *gb*3S and $\overline{gb1b2}$ is connected to lead b–5 at the output of gate STEER in FIG. 6. Lead 6–5 is normally in the high signal condition on the first count of eight-state counter 404 because the first input-output pair is always placed in the upper subpermutation. With lead 6–5 in the high signal state, the outputs of gates *gb*1S and *gb*2S are each caused to be in the low signal state. Inverter I*b*2U applies a high signal to the upper input of gate *gb*1*b*2 and inverter I*b*1U applies a high signal to the lower input of this gate. Inverter $I_1$ then applies a high signal to the set input J of flip-flop F1 causing this flip-flop to be set on the next clock pulse. Accordingly, the first input-output pair accessed by the eight-state counter has caused flip-flop F1 of the logic and test circuit of FIG. 5 to be set.

Figure 6:
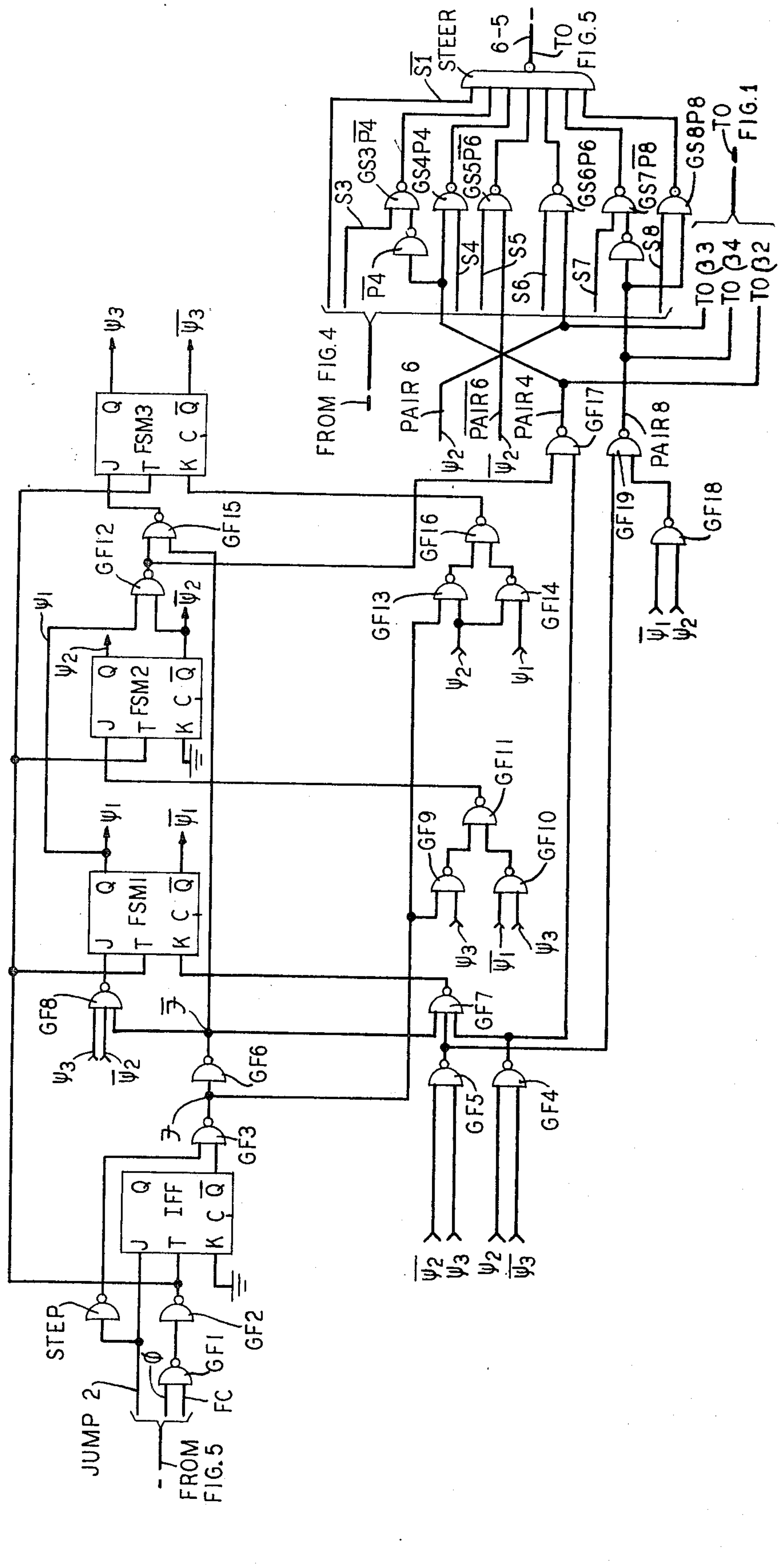

On the second count of the eight-state counter, flip-flop S2 in FIG. 4 provides a low signal on lead P2 causing another pattern of signals to appear at the output leads *b*1, *b*2, and *b*3 of sequential access memory 403. The pattern of signals on these leads is applied to the logic and test circuit of FIG. 5. During the second count of counter 404, lead 6–5 at the output of gate STEER of FIG. 6 is always in the low signal state because it is always desired to place the second input-output terminal pair in the lower subpermutation. With lead 6–5 in the low signal state, the outputs of gates *gb*1S, *gb*2S, and *gb*3S will each be in the high signal state. Inverter 16 will invert the low signal condition on lead 6–5 and apply high signals to the lower inputs of gates *gb*1SS and *gb*2SS. None of flip-flops F1 through F4 will be set by the pattern of signals appearing on leads *b*1 through *b*3 on the second output of eight-state counter 404.

If the correct pattern of bits appears on leads *b*1 and *b*2, on the succeeding counts 3 through 8 of counter 404, the pattern of bits will set all the remaining flip-flops. It will be observed that none of the flip-flops F1 through F4 will receive a high signal at its set input J when lead 6–5 is in the low signal state. The finite state machine of FIG. 6 controls gate STEER to apply a high signal state to lead 6–5 on only four of the eight counts of the eight-state counter. Accordingly, the flip-flops F1 through F4 of FIG. 5 will be set only by the pattern of bits on leads *b*1 and *b*2 representing network output points which have been selected for inclusion in the first subpermutation. If more than one of these output points are associated with the same one of the β-elements β5 through β8 of FIG. 1, then at least one of flip-flops F1 through F4 in FIG. 5 will not have been set by the time the eighth count of counter 404 has been reached. On the other hand, if the correct permutation of output points has been selected as determined by the concurrent energization of lead 6–5 and the pattern of signals on leads *b*1 and *b*2, then all four of flip-flops F1 through F4 of FIG. 5 will have been set. When all four flip-flops are set, gate COMP in FIG. 5 has high signals appearing on both of its inputs causing lead 5–4 to be in the low signal state. With lead 5–4 in the low signal state, gate *g*C in FIG. 4 will produce a high input to gate MP1 after the eighth count of counter 404 when flip-flop STT is set, and counter 404 will not be recycled. All of the β-elements in the network of FIG. 1 may now be set by the outputs of the flip-flops in FIGS. 7 and 8 and the flip-flops of the finite state machine in FIG. 6.

On the other hand, if after the first pass through counter 404 at least one of flip-flops F1 through F4 have not been set, gate COMP will provide a high signal on lead 5–4 and gate *g*C will provide a low input to gate MP1 in FIG. 4. This causes counter 404 to be recycled. Also, gate *g*D will provide a signal on lead FC to cause the finite state machine to change states. Although the same memory locations in sequential access memory 403 will be accessed on this recycling, the pattern of bits appearing on leads *b*1 through *b*3 will be steered in a different manner into the two subpermutations dependent upon the manner in which gate STEER of FIG. 6 energizes lead 6–5. On this recycling, all of flip-flops F1 through F4 may be set. If not, lead 5–4 will again be in the high state after the eighth count of counter 404. The counter will be restarted, a new pattern of energization of lead 6–5 will cause a different distribution of the output points into the two subpermutations and once again some or all of flip-flops F1 through F4 will be set. It should be noted that each time counter 404 is restarted, a high signal appears on lead FC. This high signal resets any of flip-flops F1 through F4 which had been set during the previous eight counts of counter 404. If more than one of flip-flops F1 through F4 remains unset after the eighth count of counter 404, gate GT7 will apply a high signal to lead JUMP2. The high signal on lead JUMP2 will set flip-flop IFF in finite state machine of FIG. 6. The set state of flip-flop IFF in finite state machine causes the finite state machine to advance two sequential states thereby changing two of the variables selected for inclusion in the permutation for the next and any subsequent pass through counter 404.

In the array of test gates T1 through T7 in FIG. 5, the output of gate T1 is low when flip-flops F2, F3, and F4 are set. If flip-flop F1 is also set, the $\overline{Q}$ output of flip-flop F1 will be low therefore making both inputs to gate T4 low. This makes the output of gate T4 high. When all the flip-flops F1–F4 are set, the outputs of gates T2 and T3 will also be low. The $\overline{Q}$ output of flip-flops F3 and F2 will be low making the outputs of gates T5 and T6 high. Thus, all three inputs to gate T7 are high and its output lead JUMP2 is low so that the JUMP2 lead is in the low signal state when all four flip-flops F1 through F4 are set. If only one of flip-flops F1–F4 is not set, the inputs to each of gates T4, T5, and T6 will never both be high and so each of these gates will present a high input to gate T7. Accordingly, when all flip-flops F1–F4 are set or when only one is unset, gate T7 will cause a low signal to be placed on lead JUMP2. However, if more than one of flip-flops F1–F4 remains unset, at least one of gates T4, T5, or T6 will have both of its inputs in the high signal state, that gate will therefore apply a low input to gate T7 and gate T7 will apply a high signal on lead JUMP2. A high signal on lead JUMP2 will cause the finite state machine of FIG. 6 to advance two states.

Referring now to FIG. 6, there is shown a finite state machine of the present invention. This machine functions under the control of the clock pulse Φ, the JUMP2 lead output of the logic and test circuit of FIG. 5, and the signal on the FC lead to apply different permutations of "1's" and "0's" on leads PAIR 4, 5, and 6 in the lower right-hand portion of FIG. 6. The eight different patterns of binary signals producible on the three PAIR leads represent the eight different states of the finite state machine. Normally, the finite state machine will be advanced by the signals on the FC and Φ leads to produce a sequence of binary patterns on the PAIR leads each of which patterns differs from the preceding one by a change of the binary state of only one of these leads. However, when lead JUMP2 is energized, the binary patterns thereafter produced on each energization on leads FC and Φ will be different on two of the three PAIR leads. The code pattern produced on the PAIR leads determines the outputs that are for the upper and lower networks.

The signals on the PAIR leads are ANDed with the counter output signals appearing on leads S– to enable one of gates GS3$\overline{P4}$, GS3P4, GS5$\overline{P6}$, GS6P6, GS7$\overline{P8}$, or GS8P8. When one of the last-mentioned gates is enabled, it presents a low signal input to gate SHIFT causing this gate to apply a high signal on lead 6–5. A high signal on lead 6–5 indicates that the network input and output terminals defined by a particular count of the eight-state counter and the read out of the sequential access memory are to be associated with a first subpermutation of network input-output terminals which is to be employed in defining the state of the β-elements in upper subnetwork I. On the other hand, if gate SHIFT does not provide a high signal on lead 6–5, the network input and output terminals defined by the counter and memory output are to be associated with the second subpermutation of network input and output terminals which is to be employed in defining the state of the β-elements in the lower subnetwork II.

The finite state machine is provided with three flip-flops, FSM1, FSM2, and FSM3 whose states control the binary pattern of signals on leads PAIR 4, 5, and 6. Initially, flip-flops FSM1–FSM3 are all reset and the outputs ψ1, ψ2, and ψ3 of these flip-flops are all low. Each of the gates GF1 through GF19, SHIFT, STEP, and the aforementioned GS— gates is of the conventional NAND logic type and applies a high signal at its output when one or more of its input leads have low signals applied to them. Conversely, the output of any GF–, etc., gate will be low only when all of its inputs are high. With all of flip-flops FSM1–FSM3 reset, each produces a low signal at its respective output lead ψ1, ψ2, and ψ3 and a high signal at its respective lead $\overline{\psi 1}$, $\overline{\psi 2}$, and $\overline{\psi 3}$. The signals on these leads cause low signals on each of leads PAIR 4, 5, and 6. The signal on lead PAIR 4 is low because both inputs to gate GF17 are high. The signal on the upper input to gate GF17 is high because there is a low signal on lead ψ1 at the input of gate GF12. The signal on lead PAIR 6 is low because lead ψ2 is low. Lastly, the signal on lead PAIR 8 is low when flip-flops FSM1 through FSM3 are reset because gate GF19, which controls the state of lead PAIR 8, has both of its inputs in the high signal state. The upper input lead of gate GF19 is controlled by gate GF5 one of whose inputs, ψ3, is low because flip-flop FSM3 is reset. The state of the lower input lead of gate GF19 is controlled by gate GF18 one of whose inputs ψ2 is low at this time because flip-flop FSM2 is reset.

With leads PAIR 4, 6, and 8 in the low or "0" condition, gate SHIFT will control the state of lead 6–5 as determined by lead $\overline{S1}$ and gates GS3$\overline{P4}$, GS4$\overline{P4}$, GS5$\overline{P6}$, GS6P6, GS7$\overline{P8}$ or GS8P8, as follows:

On the first count of the eight-state counter, lead S1 at the input of gate SHIFT is low making output lead 6–5 high. Accordingly, the first network input-output pair defined by the combination of the first address and the three-bit output code pattern stored at that address in the sequential access memory is associated with the first subpermutation corresponding to upper subnetwork I.

On the second count, a high signal is applied to lead $\overline{S1}$. All of the other inputs of gate SHIFT are high and so lead 6–5 is low. Accordingly, the input-output pair defined by the second address and the three-bit code pattern stored at that address are associated with the second subpermutation corresponding to lower subnetwork II.

On the third count, the output of gate GS3$\overline{P4}$ is low because both of its inputs, S3 and $\overline{P4}$ are high causing lead 6–5 at the output of gate SHIFT to be high.

The states of lead 6–5 as defined by the remaining counts 4 through 8 of the first state of the finite state machine of FIG. 6 are given in the Table II below:

TABLE II

| | State of lead 6–5 | | | | | |
|---|---|---|---|---|---|---|
| | Count | | | | | |
| Machine state | 3 | 4 | 5 | 6 | 7 | 8 |
| 1 | 1 | 0 | 1 | 0 | 1 | 0 |
| 2 | 0 | 1 | 1 | 0 | 1 | 0 |
| 3 | 0 | 1 | 1 | 0 | 0 | 1 |
| 4 | 1 | 0 | 1 | 0 | 0 | 1 |
| 5 | 1 | 0 | 0 | 1 | 0 | 1 |
| 6 | 1 | 0 | 0 | 1 | 1 | 0 |
| 7 | 0 | 1 | 0 | 1 | 1 | 0 |
| 8 | 0 | 1 | 0 | 1 | 0 | 1 |

When lead JUMP2 is in the low signal state flip-flop IFF is reset causing points F and $\overline{F}$ of the finite state machine to be respectively in the "0" and "1" signal states. Under these circumstances each time leads FC and Φ are energized, flip-flops FSM1, FSM2 and FSM3 will change states to cause the binary signal state of only one of leads PAIR 4, 6, and 8 to change. When lead JUMP2 is in the high signal state, flip-flop IFF is set causing points F and $\overline{F}$ to be in the "1" and "0" states, respectively. Under these circumstances, each time leads FC and Φ are energized, flip-flops FSM1–FSM3 will change states to cause changes in the binary signal state of two of leads PAIR 4, 6, and 8. The manner in which the states of these flip-flops is caused to be changed is as follows:

$$\text{Set FSM1} = (\psi 3 \cdot \overline{\psi 2} \cdot \overline{F})'$$
$$\text{Reset FSM1} = (\overline{F}(\overline{\psi 2} \cdot \psi 3)'(\psi 2 \cdot \overline{\psi} 3)')'$$
$$\text{Set FSM2} = ((F \cdot \psi 3)'(\overline{\psi 1} \cdot \psi 3)')'$$
$$\text{Set FSM3} = (\overline{F}(\psi 1 \cdot \overline{\psi} 2)')'$$
$$\text{Reset FSM3} = ((F \cdot \psi 2)'(\psi 2 \cdot \psi 1)')'$$

The above equations for setting and resetting flip-flops FSM1 through FSM3 may be derived from the information in the following table:

TABLE III

| Present state | FSM 1 2 3 | Advance (COMP) | Advance (JUMP 2) |
|---|---|---|---|
| A | 0 0 0 | 1 0 0 | 1 0 1 |
| B | 1 0 0 | 1 0 1 | 0 0 1 |
| C | 1 0 1 | 0 0 1 | 0 1 1 |
| D | 0 0 1 | 0 1 1 | 1 1 1 |
| E | 0 1 1 | 1 1 1 | 1 1 0 |
| F | 1 1 1 | 1 1 0 | 0 1 0 |
| G | 1 1 0 | 0 1 0 | |
| H | 0 1 0 | | |

In Table III, the eight states of the finite state machine are represented by the letters A through H. Three binary bits FSM1, FSM2, and FSM3 define each of these states. Normally, the finite state machine will progress from one state to another by merely changing the state of one of its flip-flops FSM1–FSM3. In Table III the present state of the finite state machine is shown in the leftmost column. When the JUMP2 lead is "0," it is seen in the table that the next state of the finite state machine differs in only one bit position corresponding to a change in the state of only one of the flip-flops FSM1–FSM3. When the JUMP2 lead is in the "1" or high signal state condition, it is seen that the next state of the finite state machine differs in two bit positions corresponding to changes in two of the flip-flops FSM1–FSM3. In Table III it should be appreciated that the pattern of bits selected for state A is purely arbitrary. Any pattern of bits could have been selected to represent state A and a similar table derived for the remaining states provided the rule was obeyed that each successive state shall differ from its preceding state by a change in only one bit position so long as the JUMP2 lead is in the "0" state and shall change the state of two bit positions when the JUMP2 lead is in the "1" state.

Figure 7:
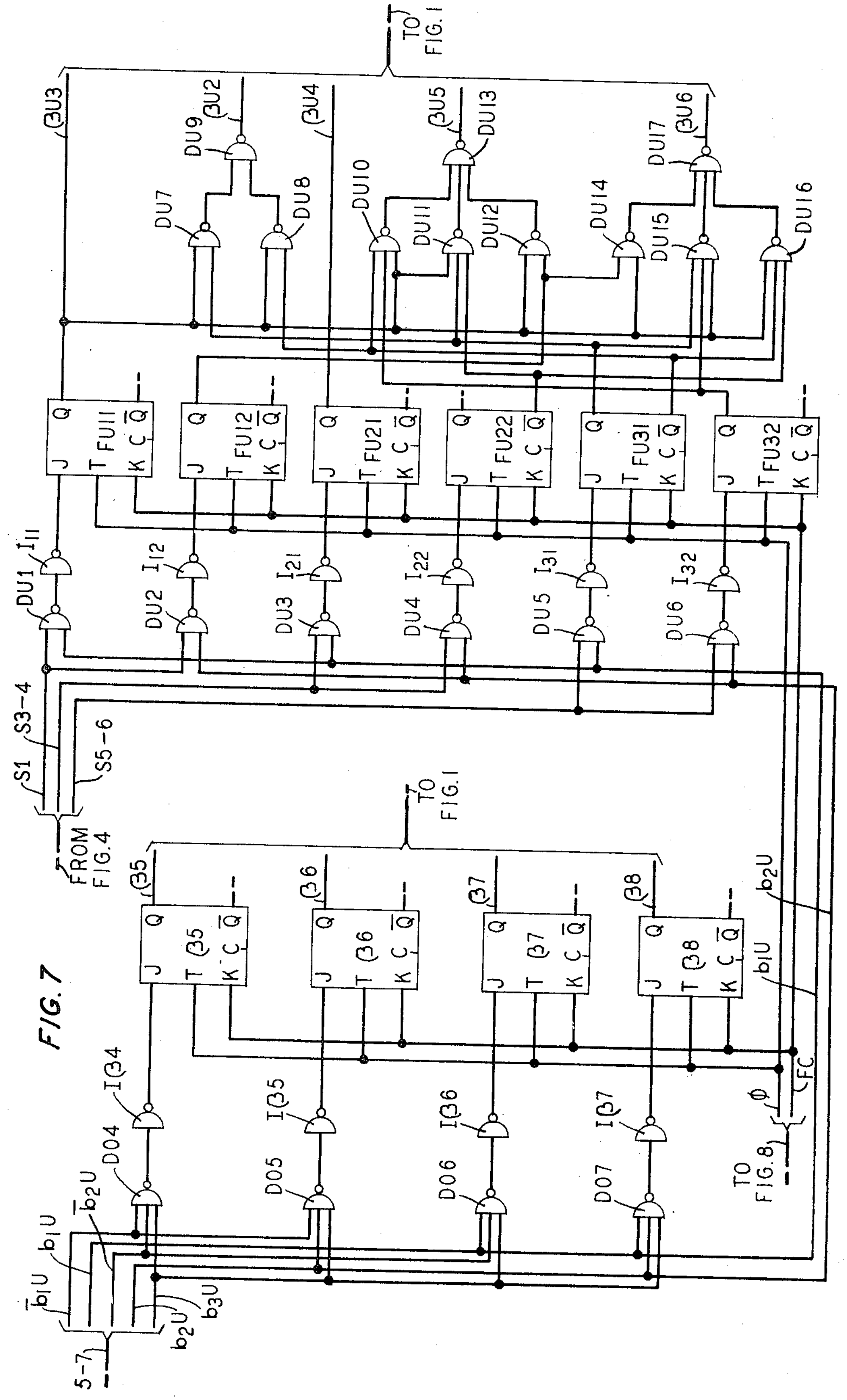

Referring now to FIG. 7, there is shown the gating and flip-flop arrangement for decoding the pattern of bits appearing on leads $b1$U, $b2$U, $b3$U, $\overline{b1\text{U}}$, and $\overline{b2\text{U}}$ on each count of the eight-state counter. The flip-flops of FIG. 7 store the signals for driving the $\beta$-elements of the network of FIG. 1. The $\beta$-elements of FIG. 1 may advantageously each consist of a reversing switch actuated by a solenoid winding (not shown). The outputs of flip-flops F$\beta$5–F$\beta$8 in FIG. 7 accordingly will be connected to the solenoid control windings (not shown) of $\beta$-elements $\beta$5–$\beta$7 of FIG. 1. On the first count of counter 404, lead S1 is energized. The information on leads $b1$U and $b2$U is stored in flip-flops FU11 and FU12. On count 3 or count 4 (depending upon on which count lead 6–5 was energized to steer an output digit to the upper network) counter 404 on lead S3–S4 is energized. The information on leads $b1$U and $b2$U also controls flip-flops FU21 and FU22 via gates DU1, DU3, and DU4, respectively. On counts 5 and 6, information on leads $b1$U and $b2$U is gated to flip-flops FU31 and FU32 by respective gates DU5 and DU6. The states of flip-flops FU11, FU12, FU21, FU22, FU31, and FU32, decoded by gates DU7 through DU17 energizes leads $\beta$U3, $\beta$U2, $\beta$U4, $\beta$U5, and $\beta$U6 selectively to energize the correspondingly numbered $\beta$-elements of FIG. 1. The combinational logic defined by gates DU7 through DU17 may advantageously be derived through the use of a "truth table" in which the states of leads $\beta$U2 through $\beta$U6 are set forth for each of the 24 different $\beta$-element states.

Figure 8:
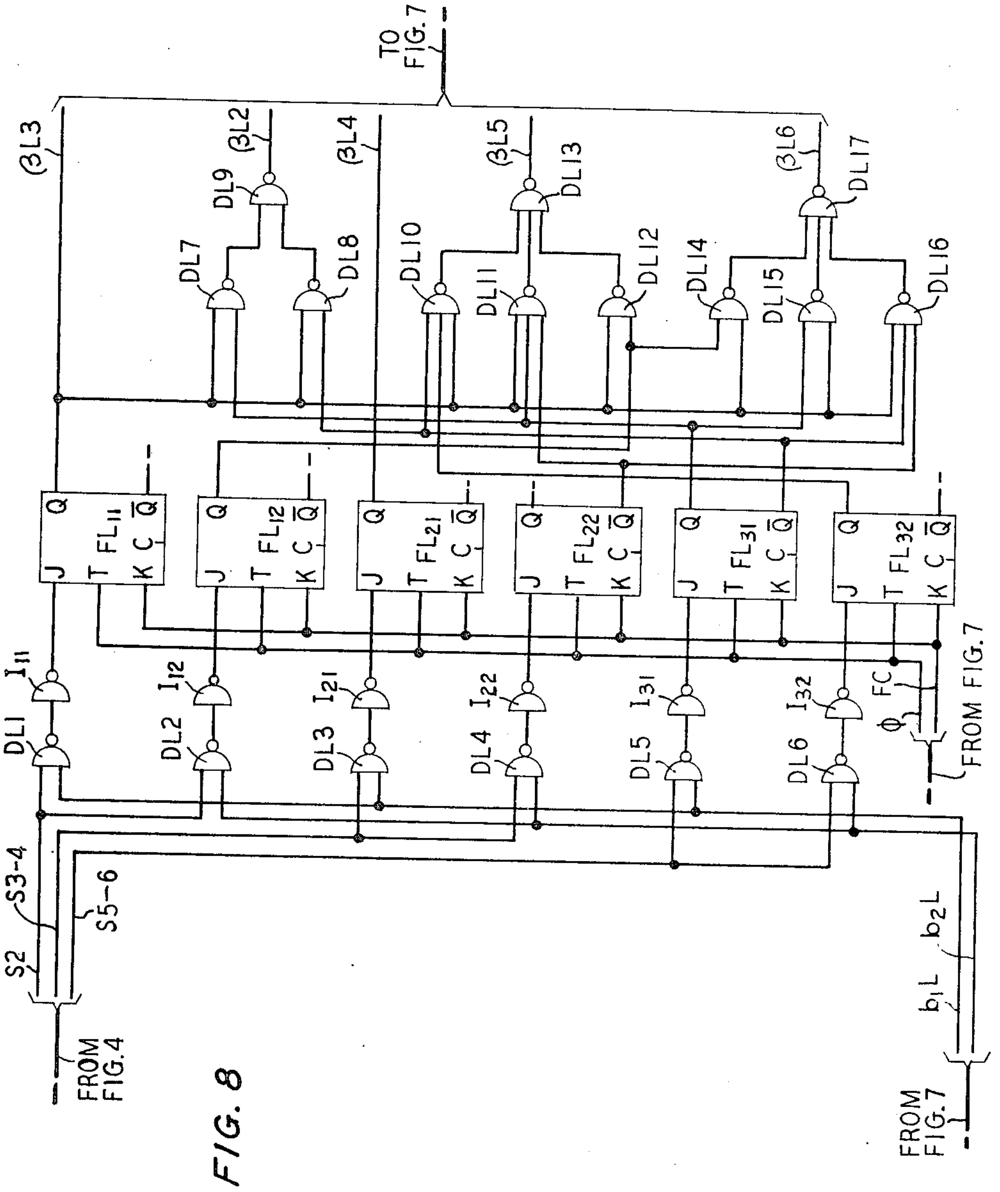

FIG. 8 is similar to the right-hand portion of FIG. 7 but controls the setting of $\beta$-elements $\beta$L2 through $\beta$L6 of lower subnetwork II in response to the information appearing on leads $b1$L and $b2$L during counts S2 through S6 of counter 404.

From what has been described so far it will be apparent that networks having other than N input and N output terminals may be controlled in the manner we have taught. Thus, for example, a network having N input and M output terminals where N is a power of 2 and divisible by M may be so controlled. In this case it is merely necessary to assign "dummy" outputs to the idle inputs at each level of the network. The last level of such an N×M network would be comprised of M networks of size N/M×1 instead of $\beta$-elements (2×2). The N/M×1 networks are built from N–M half $\beta$-elements, i.e., 2×1 switches.

It should also be apparent to those skilled in the art that a given switching network can be controlled by combinations of the methods herein described. Thus, we have shown, for example, how the method employing a finite state machine may be combined with the use of combinational logic for setting the 4×4 networks. In similar fashion, the two-memory search method may be combined with the combinational logic method, etc. Other such combinations will be apparent to those skilled in the art in the light of what we have described herein.

What is claimed is:

1. A method of establishing the states of dual terminal reversing switch ($\beta$-elements) in a switching system including a plurality of stages of $\beta$-elements for connecting each of a plurality of input terminals to a respective one of a plurality of output terminals, comprising the steps of storing in an addressable input-output memory the identity of each output terminal to which a connection is to be made at the address of the input terminal to be involved in said connection;

storing in an addressable output-input memory the identity of each input terminal from which said connection is to be made at the address of the output terminal to be involved in said connection;

addressing said memories alternately to select a set of input and corresponding output terminals which contains no dual of any input or output terminal already selected for said set;

modifying the number of each terminal included in said set to identify the number of the $\beta$-element to be set; and setting said last-mentioned $\beta$-element to straight-through for each terminal in said set having an odd number and to crossed for each terminal in said set having an even number.

2. The method of claim 1 wherein said terminal numbers are encoded in the binary one-less code, and wherein said terminal numbers are modified by masking a predetermined bit position of said one-less code identifying said numbers.

3. In a switching system having a plurality of reversing switch $\beta$-elements arranged in cascaded stages, the combination for controlling said $\beta$-elements to connect any input point to any output point without blocking, comprising memory means for storing a list of the coded identities of input and output terminals to be connected by said network, said terminals each being designated in said list in the binary one-less code;

means for selecting from said stored list a pair of sublists of said input and output terminals such that each such sublist contains only one input terminal from each pair of input terminals belonging to a given input $\beta$-element and only one output terminal from each pair of output terminals belonging to a given output $\beta$-element;

means for setting each $\beta$-element identified by an odd-numbered terminal in one of said sublists to straight-through and each $\beta$-element identified by an even numbered terminal in said same sublist to crossover;

means for modifying the coded designations of said terminals in said sublists; and means for furnishing said modified designations to said selecting means and said setting means until all of said β-elements in said switching network have been set.

4. A system according to claim 3 wherein said means for setting said β-elements identifies the β-element to be set by computing the integer value of the number obtained by taking the numbers of the input and output terminals in said sublist, increasing the number by 1 and dividing the sum by 2.

5. In a system according to claim 3, the combination wherein said means for setting said β-elements identifies the β-element to be set by taking the number of each terminal included in one of said sublists which is coded in said one-less code and deleting the rightmost binary digit thereof.

6. In a system according to claim 5, the combination wherein said means for modifying said coded designations masks therefrom the rightmost binary digit thereof.

7. In a system according to claim 3, the combination wherein said selecting means include means for comparing corresponding bit positions of said coded designations and for selecting for inclusion in each sublist only one of each pair of said designations having predetermined bit positions which agree.

8. In a switching system according to claim 3, the combination wherein said selecting means includes means for addressing said memory means to read therefrom the coded identities of said input and output terminals;

means operative each time a pair of said input and output terminal identities is read from said memory means for marking said pair as belonging to a first or to a second sublist of input-output terminal pairs;

means for examining predetermined bit positions of the coded designations of said terminal pairs included in one of said sublists; and means controlled by said examining means for indicating when each of a predetermined pattern of bits has appeared in said one of said sublists.

9. In a switching system according to claim 3, the combination wherein said selecting means includes means for addressing a predeterminable sequence of addresses in said memory means;

means for examining predetermined bit positions of the coded designations of said output terminals read from said memory responsive to said addressing means; and means controlled by said examining means for changing said predeterminable sequence of addresses.

10. In a switching system according to claim 9, the combination wherein said means controlled by said examining means changes as many of said addresses in said predeterminable sequence as the number of pairs of said coded designations having said bit positions which are alike.

11. In combination, a switching network having input and output terminals comprising a plurality of two pole β-elements arranged in cascaded stages, each sequentially numbered pair of said terminals being associated with a respective input or output one of said β-elements, memory means for storing in a binary one-less code the identities of the input and output terminals of said network between which connections are to be established, and means responsive to said stored identities for selectively setting the state of certain of said β-elements to establish two independent groups of connections in said network.

12. The combination of claim 11 further comprising means for modifying the stored identities and means for furnishing said modified identities to said setting means until all of said β-elements in said switching network have selectively been set or reset.

13. The combination of claim 11 wherein said independent groups of connections include a stage of β-elements each of which β-elements has one of its two poles included in a respective one of said two connection groups established in said network.

* * * * *